US007263351B2

(12) United States Patent
Ross et al.

(10) Patent No.: US 7,263,351 B2
(45) Date of Patent: Aug. 28, 2007

(54) WIRELESS NETWORK OPTIMIZATION THROUGH REMOTE DEVICE DATA

(75) Inventors: David J. Ross, San Diego, CA (US); Jason B. Kenagy, San Diego, CA (US); Jin Dai, San Diego, CA (US); Tia M. Cassett, San Diego, CA (US); Daniel H. Agre, San Diego, CA (US); Mazen Chmaytelli, San Diego, CA (US); Arne Croizat Joseph Mortensen, San Diego, CA (US); Ravinder Chandhok, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/187,760

(22) Filed: Jul. 1, 2002

(65) Prior Publication Data

US 2004/0203719 A1    Oct. 14, 2004

(51) Int. Cl.
*H04M 3/00* (2006.01)

(52) U.S. Cl. ............ 455/419; 455/420; 455/423; 455/67.11

(58) Field of Classification Search ........ 455/423, 455/41.2, 41.3, 426, 466, 67.11, 419, 420
See application file for complete search history.

(56) References Cited

U.S. PATENT DOCUMENTS

| 4,696,027 | A | 9/1987 | Bonta |
| 5,003,619 | A | 3/1991 | Morris et al. |
| 5,428,821 | A | 6/1995 | Krisna et al. |
| 5,579,367 | A | 11/1996 | Raymond et al. |
| 5,694,451 | A | 12/1997 | Arinell .................. 379/34 |
| 5,784,406 | A | 7/1998 | DeJaco et al. |
| 6,088,588 | A | 7/2000 | Osborne .................. 455/425 |
| 6,151,355 | A | 11/2000 | Vallee et al. |
| 6,169,903 | B1 * | 1/2001 | Dorenbosch et al. ........ 455/458 |
| 6,339,698 | B1 * | 1/2002 | Cullen .................... 455/67.11 |
| 6,374,124 | B1 | 4/2002 | Slabinski |
| 6,445,907 | B1 | 9/2002 | Middeke et al. ......... 455/226.1 |
| 6,459,894 | B1 * | 10/2002 | Phillips et al. ............. 455/424 |
| 6,490,455 | B1 * | 12/2002 | Park et al. ................. 455/456.4 |
| 6,535,498 | B1 * | 3/2003 | Larsson et al. ............. 370/338 |
| 6,640,253 | B2 * | 10/2003 | Schaefer .................... 709/248 |
| 6,745,011 | B1 | 6/2004 | Hendrickson et al. ... 455/67.11 |
| 6,751,457 | B1 | 6/2004 | Martin .................... 455/424 |
| 6,754,470 | B2 | 6/2004 | Hendrickson et al. ... 455/67.11 |
| 6,832,373 | B2 | 12/2004 | O'Neill .................... 717/171 |
| 2002/0009970 | A1 | 1/2002 | Asia et al. |
| 2004/0198294 | A1 * | 10/2004 | Hagin-Metzer ............. 455/296 |

* cited by examiner

*Primary Examiner*—Temica Beamer
(74) *Attorney, Agent, or Firm*—Abdoliah Katbab; Charles Brown; Thomas R. Rouse (57) ABSTRACT

A system, method, and program for optimizing a wireless network having at least data communication between computer devices selectively connected thereto, and at least one of the computer devices is a remotely located wireless device. The wireless device has a resident network optimization application that causes the selective transmission of network status data to at least one other computer device on the wireless network, and either the data-receiving computer device or another computer device on the wireless network optimizes the wireless network based upon the received network status data.

35 Claims, 3 Drawing Sheets

WIRELESS NETWORK OPTIMIZATION THROUGH REMOTE DEVICE DATA

BACKGROUND OF THE INVENTION

I. Field of the Invention

The present invention generally relates to computer networks and communications across wireless networks. More particularly, the invention relates to the collection and analysis of data from remote devices on a wireless network for use in optimization of network functionality, management and performance.

II. Description of the Related Art

Wireless networking connects one or more wireless computer devices to other computer devices without a direct electrical connection, such as a copper wire or optical cable. Wireless computer devices communicate data, typically in the form of packets, across a wireless or partially wireless computer network and open a "data" or "communication" channel on the network such that the device can send and receive data packets. The computer devices often have computer device resources, such as programs and hardware components, which individually use open communication connections to transmit and receive data on the network.

In wireless networking, a peer-to-peer (or point-to-point) wireless network means that each computer can communicate directly with every other computer on the network. A cellular telecommunication network can be a wireless network wherein the cellular devices transmit voice or data packets across the cellular network. However, some wireless networks are in client/server architecture, and have an access point, which is a wired controller that receives and transmits data to the wireless adapters installed in each computer. There are generally six types of wireless computer networks: Cellular or PCS, Satellite, Bluetooth, Infrared Data Association, HomeRF (SWAP); and wideband data/WECA (Wi-Fi) or 802.11.

CDMA/WCDMA/UMTS, AMPS and or TDMA/GSM cellular networks, digital and or analog satellite systems. Bluetooth is not widely available yet and is not expected to replace the need for high-speed data networks between computers. Infrared Data Association (IrDA) is a standard for computer devices to communicate using infrared light pulses, similarly to how remote controls operate. Since IrDA computer devices use infrared light, they depend on being in direct line of sight with each other. An IrDA-based network is currently capable of transmitting data at speeds up to 4 megabits per second (Mbps). HomeRF, RF standing for radio frequency, is based upon a standard called Shared Wireless Access Protocol (SWAP), with is a hybrid standard including six voice channels based on the digital enhanced cordless telecommunications (DECT) standard and the IEEE 802.11 wireless-Ethernet specification for data. SWAP devices make 50 hops per second and transmit at 1 Mbps. In most cases, SWAP-based networks are point-to-point. The Wireless Ethernet Compatibility Alliance (WECA) is essentially compliant with a variation of the IEEE 802.11 specification known as IEEE 802.11b. This specification focuses on direct-sequence spread spectrum (DSSS) transmission because of the higher data rate it can attain. Under 802.11b, devices communicate at a speed of 11 Mbps whenever possible.

There are many diagnostic tools usable with an extant wireless network that can give technicians feedback and performance data such that the network can be optimized among the various nodes thereof. In cellular networks, one method to gather network data is to equip automobiles with diagnostic equipment and have them drive around the cell coverage area and record connectivity with the cellular base stations. This method however is expensive to implement, time consuming, and often cannot obtain data for the full coverage area of the cell.

Accordingly, it would be advantageous to provide a system and method that allows the real-time, non-real time, and economical optimization of the nodes of a wireless network with optimal data reflecting the true geographic coverage area of the network. The system and method should not cause interruption of the existing data communication occurring across the wireless network. Further, such system should not require significant additional equipment for implementation, such as separate automobiles and analysis equipment. It is thus to the provision of such a system and method to optimize an active wireless network that the present invention is primarily directed.

SUMMARY OF THE INVENTION

The present invention is a system, method, and program for optimizing a wireless network having at least data communication between computer devices selectively connected thereto, and at least one of the computer devices is a remotely located wireless device, such as a cellular telecommunication device. In the system, a plurality of wireless devices that are located remotely from each other and in selective communication with other computer devices across the wireless network, each wireless device including a computer platform, and at least one network optimization application is resident on the computer platform of each wireless device wherein the application causes that wireless device to selectively transmit network status data for that wireless device to another computer device on the wireless network. The optimization of the wireless network then occurs from the utilization of the transmitted data from the wireless devices in either an automated real time, or scheduled mode, or a user interactive mode.

The method for optimizing a wireless network includes the steps of establishing a wireless network having at least data communication between computer devices selectively connected thereto, with at least one of the computer devices a remotely located wireless device including a computer platform, selectively transmitting network status data from the at least one wireless device to at least one other computer device on the wireless or wired network, receiving the transmitted network data at the at least one other computer device, and optimizing or simply better understanding the nature of the wireless network based upon the received network status data. The step of optimization or understanding can occur either at the computer device, such as a server, receiving the network status data, or at another computer device on the network. Optimization of the network or implementation of changes to the network may also occur in traditional fashion e.g. moving antennas and the like, as a result of better network understanding from having received this data in this unique fashion. The method can further include the steps of transmitting the optimization data back to the one or more wireless devices and modifying the wireless device based upon the optimization data.

The present invention thus provides a system and method that optimizes the wireless network based upon real-time data and store and forward data, collected, transmitted and automated. The present invention further provides an advantage in that a wireless network, such as a cellular telecommunication network, can be optimized without compromising the functionality of the network, or the need to use external monitoring equipment. Network optimization data is collected directly by the user terminals of the wireless network. A network optimization application (or software agent) can be downloaded to the wireless devices and cause the production of valuable data therefrom relative to the actual operation within the wireless network coverage area.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
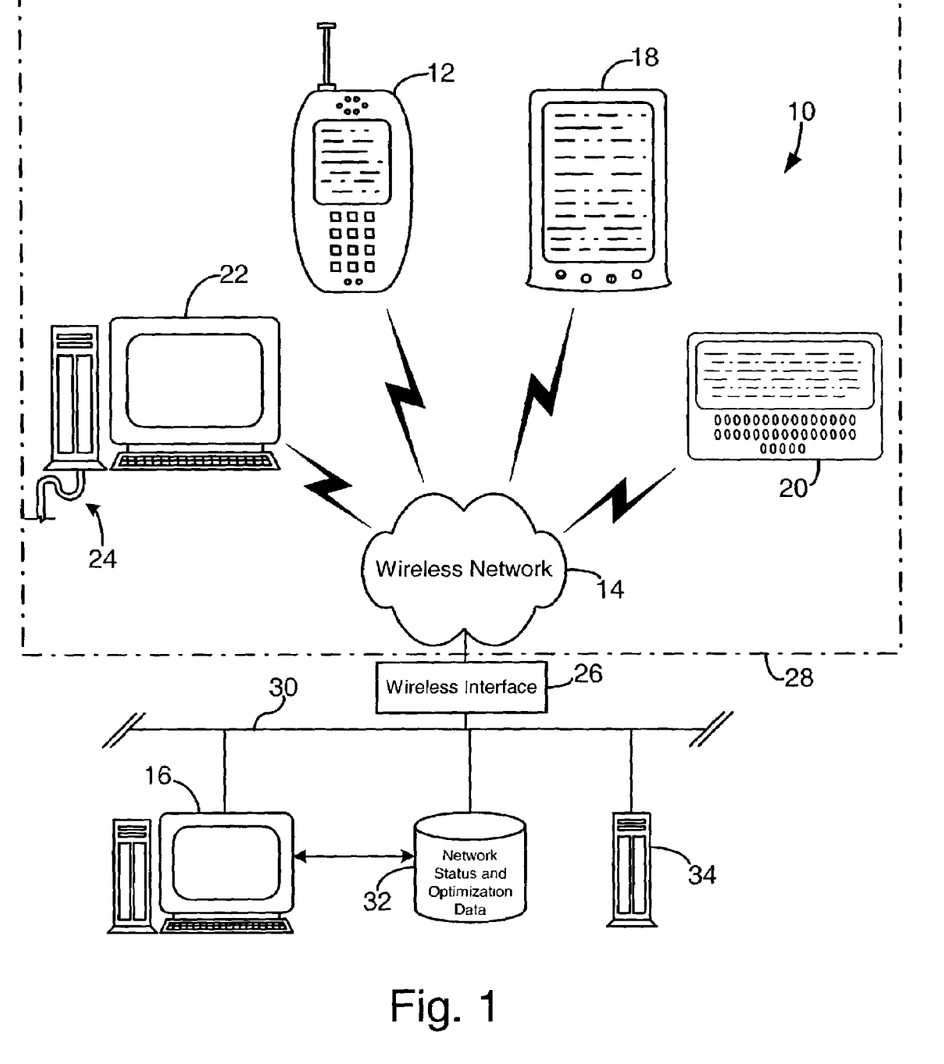
FIG. 1 is a representative diagram of one embodiment of a wireless network, with a partial LAN, having several computer devices that communicate with each other across the network.

With reference to the figures in which like numerals represent like elements throughout, FIG. 1, illustrates a wireless network 10 having a plurality of computer devices 12, 18, 20, and 22 in a wireless network area 28. The wireless network 14 is connected through an interface 26 to a LAN-based network 28, with preferably at least one network status data-gathering and/managing server 16, wherein the server 16 selectively downloads software applications or agents to the wireless devices 12, 18, 20, 22 across the wireless interface 26 such that the wireless device can supply network status data back to the server 16 as is further described herein. Such computer devices can include wireless devices, such as cellular telephone 12, a personal digital assistant 18, a pager 20, which is shown here as a two-way text pager, or even a separate computer platform 22 that has a wireless communication portal, and may otherwise have a wired connection 24 to a network or the Internet. The system and method can accordingly be performed on any form of computer device computer module including a wired or wireless communication portal, including without limitation, wireless modems, PCMCIA cards, access terminals, personal computers, access terminals, telephones without a display or keypad, or any combination or sub-combination thereof.

On the LAN network 30, the server 16 can be in communication with a separate storage 32 for the network status and optimization data. The server 16 and its correspondence PC or data access can give a ready view of the network status data collected from the wireless devices in any form, such as tables, maps, graphics views, plain text, or any other display as would be known to known of skill in the art. The server 16 (or plurality of servers) thus sends software agents or applications to wireless devices 12, 18, 20, 22 in the wireless network area 28 such that the wireless devices return active data, such as user ID, geographic position, Network ID, System ID, model ID, resident software, and the like. The wireless devices 12, 18, 20, 22 then transmit the requested data to the server 16, or other computer device on the network, wherein at least the wireless network 14 can be optimized, even in substantially real-time if desired. Further, there can be a separate data management server 34 resident that works in concert to provide data in usable formats to parties and/or a separate layer of control in the data flow between the wireless devices 12, 18, 20, 22 and the server 16 or data storage 32.

Figure 2:
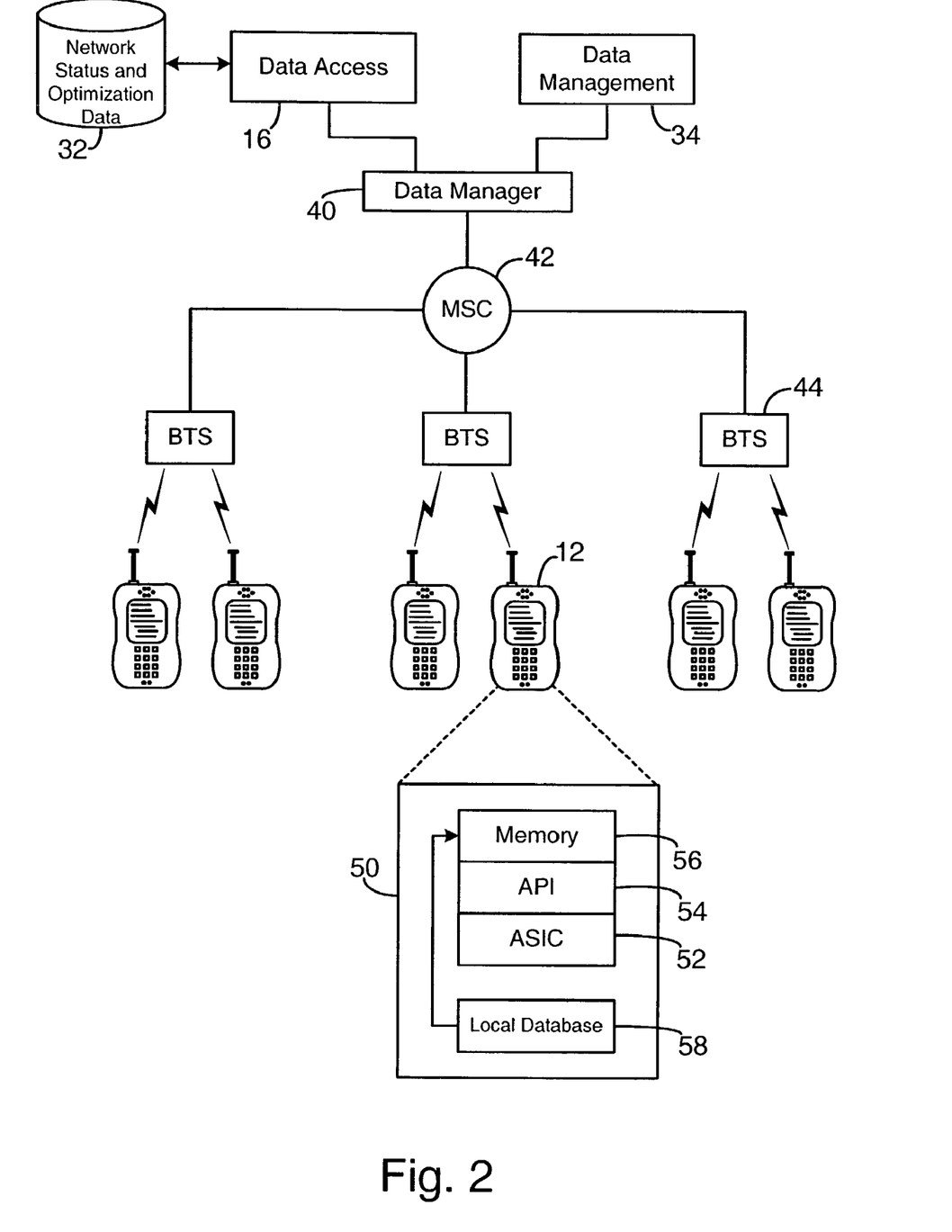
FIG. 2 is a block diagram of the hardware components of the system embodied on a cellular wireless network providing communication between different wireless devices, such as cellular telephones, and computer devices.

The use of cellular telecommunication pathways has been increasing because wireless devices, such as cellular telephone 12, are being manufactured with increased computing capabilities and are becoming tantamount to personal computers and hand-held personal digital assistants ("PDAs"), communicating packets including voice and data over the wireless network. These "smart" cellular telephones have installed application programming interfaces ("APIs") onto their local computer platform that allow software developers to create software applications that operate on the cellular telephone, and control certain functionality on the device. FIG. 2 is a block diagram that more fully illustrates the components of a cellular wireless network and interrelation of the elements of the present inventive system. The cellular wireless network is merely exemplary and can include any system whereby remote modules, such as wireless devices 12, 18, 20, 22, communicate over-the-air between and among each other and/or between and among components of a wireless network 14, including, without limitation, wireless network carriers and/or servers.

The network status data-gathering server 16 and the network status and optimization database 32, and other data management server 34, will be present on the cellular data network with any other components that are needed to provide cellular telecommunication services. The server 16, and/or data management server 34 communicate with a carrier network through a data manager 40, through a data link, such as the Internet, a secure LAN, WAN, or other network. The carrier network controls messages (generally being data packets) sent to a messaging service controller ("MSC") 42. The carrier network communicates with the MSC 42 by a network, the Internet, and/or POTS ("plain ordinary telephone system"). Typically, the network or Internet connection between the carrier network and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

Each wireless device, such as cellular telephone 12, has a computer platform 50 that can receive and execute software applications and display data transmitted from the application download server 16 or other network servers 34. The computer platform 50 also includes an application-specific integrated circuit ("ASIC") 52, or other processor, microprocessor, logic circuit, or other data processing device. The ASIC 52 is installed at the time of manufacture of the wireless device and is not normally upgradeable. The ASIC 52 or other processor executes the application programming interface ("API") layer 54 that interfaces with any resident programs in the memory 56 of the wireless device. The memory can be comprised of read-only or random-access memory (RAM and ROM), EPROM, EEPROM, flash cards, or any memory common to computer platforms. The computer platform 50 also includes a local database 58 that can hold the software applications, file, or data not actively used in memory 56, such as the software applications or downloaded from the application download server 16. The local database 58 is typically comprised of one or more flash memory cells, but can be any secondary or tertiary storage device as known in the art, such as magnetic media, EPROM, EEPROM, optical media, tape, or soft or hard disk. The local database 58 can ultimately hold a resident copy of a network optimization application or agent as is further described herein.

The system for optimization of a wireless network 14 having at least data communication from computer devices selectively connected thereto with a plurality of wireless devices 12, 18, 20, 22 located remotely from each other and each in selective communication with other computer devices, such as server 16, across the wireless network, pushes at least one network optimization application to be resident, at least temporarily, on the computer platform 50 of each wireless device 12, 18, 20, 22 that causes that wireless device to selectively transmit network status data for that wireless device to another computer device on the wireless network. The network status data can include criteria such as signal strength, Ec/Io, Latitude-Longitude or other geographical data, Time, FER, BER, RSSI, PN, System ID, or Network ID, Model ID, and can capture wireless device 12, 18, 20, 22 state data, such as idleness, data or voice call, dormancy or inoperation, which is generated from wireless device operation. Moreover, the network status data can allow for specific troubleshooting of a device within the wireless network 14 based upon the gathered network status data. The network optimization application or agent can be permanently stored in the local database 58 of the wireless device computer platform 50, or can only be temporarily held in memory 56 thereof for a one time (or n-time) execution to transmit network status data.

In one embodiment, the network optimization application transmits the network status data from that wireless device 12, 18, 20, 22 to a server 16 across the wireless network 14 when requested. Alternately, the network status data is transmitted over an open communication connection from the wireless device 12, 18, 20, 22 to the wireless network 14, and thus "piggybacked" across an open connection, such as a voice or data call at the cellular telephone 12. In a cellular network configuration such as that shown in FIG. 2, the network status data can be transmitted to the server 12 through short message service.

Figure 3:
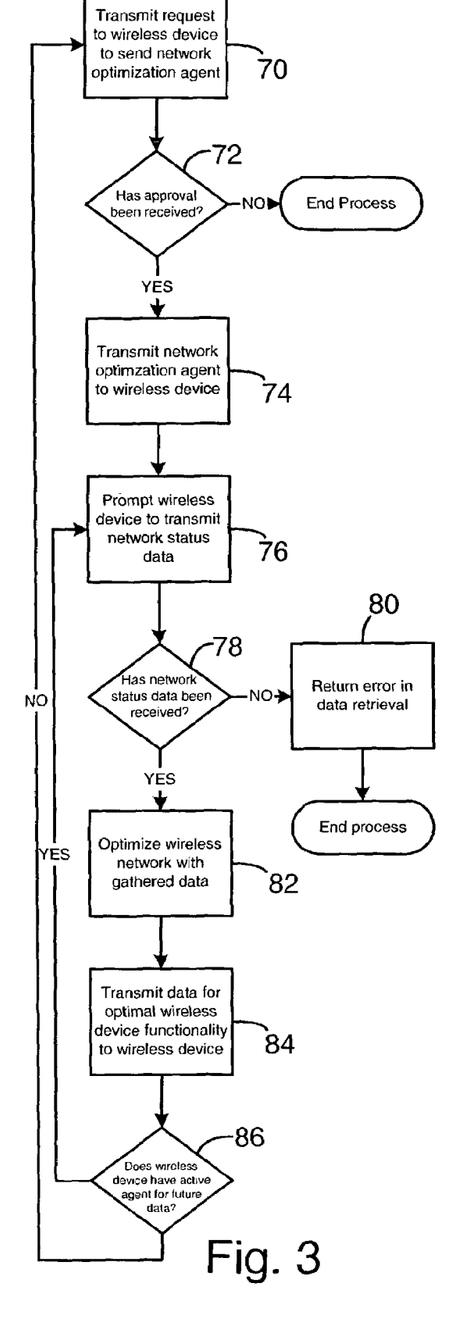
FIG. 3 is a flowchart illustrating the process executing on a network status data-gathering server in communication with wireless devices across the network.

The specific process of the program executing on the server 16 to optimize the wireless network 14 is shown in the flowchart of FIG. 3. A request to send a network optimization application (agent) is sent to a wireless device 12, 18, 20, 22, as shown at step 70, and the server 16 makes a determination as to whether an approval to transmit the agent has been received from the wireless device 12, 18, 20, 22, as shown at decision 72. If the approval has not been received at the server 16, then the process ends. Otherwise, if the approval has been received at the server 16 at decision 72, then the network optimization agent is transmitted to the wireless device 12, 18, 20, 22 as shown at step 74, and then the wireless device 12, 18, 20, 22 is prompted to transmit network status data to the server 16, as shown at step 76.

A determination is made as to whether the network status data has been received at the server 16, as shown at decision 78. If the network status data has not been received, then an error is returned to the calling process, as shown at step 80, and the process ends. Otherwise, if the network status data has been received at the server 16 at decision 78, then the wireless network 14 is optimized with the gathered network status data, as shown at step 82. The optimization can occur on the specific server 16 that gathered the network status data, or alternately, the optimization can occur on another computer device, such as data management server 34, or other wireless device, such as PC 22 on the wireless network 14.

As embodied here, the server 16 also transmits the network optimization data back to the wireless device 12, 18, 20, 22 such that the device can modify its functionality in accord with the optimal network, as shown at step 84, although such step is preferable and not necessary to operation of the present invention. After the transmission of the optimization data to the wireless device at step 84, a determination is made as to whether the wireless device has the requisite agents for future network status data transmission, as shown at decision 86. If the wireless device 12, 18, 20, 22 does have the proper network optimization application or agent to transmit network status data, then the process returns to step 76 and selectively prompts the wireless device to transmit network status data when necessary. Otherwise, if the wireless device 12, 18, 20, 22 does not have the requisite network optimization application or agent, then the process returns to step 70 and attempts to load the specific application or agent onto the wireless device 12, 18, 20, 22 with end-user permission requested.

Figure 4:
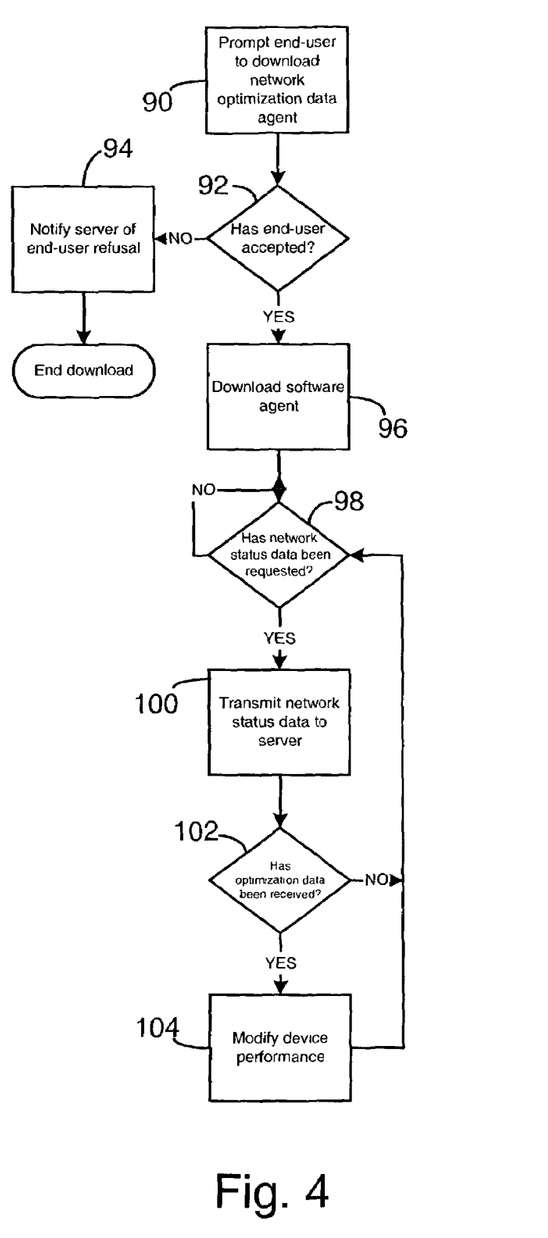
FIG. 4 is a flowchart illustrating the process executing on a wireless device receiving a software agent that causes network status data to be transmitted to the server of FIG. 3.

FIG. 4 is a flowchart illustrating the process executing upon the computer platform 50 of a wireless device 12, 18, 20, 22 in tandem with the process executing on the server 16 shown in the flowchart of FIG. 3. The wireless device 12, 18, 20, 22 received the request and prompts the user to download the network optimization application or agent, as shown at step 90. It should be noted that such prompting could occur from an application installed on the wireless device 12, 18, 20, 22 at manufacture and which prompts the end-user thereof for download permission during device configuration or at some other predefined moment. A determination is then made as to whether the end-user has accepted the download, as shown at decision 92. If not, the server 16 is notified of the end-user refusal to download the network optimization application or agent, as shown at step 94, and the download process terminates. Otherwise, if the end-user has accepted the download at decision 92, then the network optimization application or agent is downloaded (and preferably installed shortly thereafter) as shown at step 96.

A determination is then made as to whether the network status data has been requested, as shown at decision 98, such request coming from server 16 at step 70 in FIG. 3. If no request has been made, then the thread process returns to decision 98 to enter a wait-state until the network status data is requested. Otherwise, if the network status data has been requested at decision 98, then the network status data is transmitted to the requesting server 16 or other computer device on the wireless network 14, as shown at step 100. Then a determination is made as to whether network optimization data has been sent from the server 16, as shown at decision 102. Such step corresponds to the network optimization data transmission step 84 of the server 16 in FIG. 3, and is only one embodiment of optimizing the network through wireless device modification. If network optimization data has been received at decision 102, then the wireless device 12, 18, 20, 22 performance is modified based upon the received data, as shown at step 104. If there is no network optimization data received at decision 104, or after wireless device modification at step 104, the process returns to determine if network status data has been requested at decision 98. If the network optimization application or agent is only temporary, then the process will end after step 104, and will only resume upon the redownload of a network optimization application, i.e. return to step 90.

The present system therefore provides a method for optimizing a wireless network 14 including the steps of establishing a wireless network 14 having at least data communication between computer devices selectively connected thereto, at least one of the computer devices a remotely located wireless device, such as wireless devices 12, 18, 20, 22 including a computer platform 50 and having an end-user thereof, selectively transmitting network status data from the at least one wireless device to at least one other computer device, such as network status data-gathering server 16 on the wireless network 14, receiving the transmitted network data at the at least one other computer device, and optimizing the wireless network 14 based upon the received network status data. The step of optimizing the wireless network 14 can occur at the at least one computer device that receives the network status data, such as server 16, or can occur at another computer device (wireless or LAN based) on the network.

The step of transmitting network status data preferably occurs from the execution of a network optimization application resident on the computer platform 50 of the at least one wireless device (such as cellular telephone 12). In one embodiment, the step of transmitting the network status data from the at least one wireless device 12, 18, 20, 22 is transmitting the network status data to a server 16 across the wireless network 14. If the wireless device opens a communication connection from the at least one wireless device to the wireless network 14, the step of transmitting network status data can be transmitting the network status data over the open communication connection. And if the wireless network is a cellular telecommunication network such as shown in FIG. 2, the step of transmitting network status data can be transmitting cellular network status data from a cellular device, such as cellular telephone 12, to a server 16 across the cellular telecommunication network, and such transmission can occur through short message service.

The method can further include the steps of gathering the optimized network data at the computer device, such as server 16, transmitting the optimized network data across the wireless network 14 to the at least one wireless device 12, 18, 20, 22 (step 84 in FIG. 3), receiving the optimized network data at the at least one wireless device 12, 18, 20, 22 (Decision 102 in FIG. 4), and modifying the wireless device 12, 18, 20, 22 operation based upon the received optimized network data (step 104 in FIG. 4). If permission is desired from the end-user before downloading and or using or allowing the use of the application or agent thereto, the method can further include the step of prompting the end-user of the at least one wireless device 12, 81, 20, 22 to accept the network optimization application prior to download of the network optimization application, as shown at step 70 in FIG. 3, and then the step of downloading the network optimization application to the at least one wireless device 12,18,20,22 occurs (Step 74). The method can also include step of identifying the end-user of the at least one wireless device 12, 18, 20, 22, through the use of any method known in the arts, such as a MIN, PIN, Device ID, or specific User ID.

The wireless device 12, 18, 20, 22, which can be a part of the system or separate thereto, has at least one network optimization application resident (either permanent or temporarily) on the computer platform 50 thereof which causes the selective transmission of network status data for that wireless device to another computer device (such as server 16) on the wireless network 14. If the wireless device 12, 18, 20, 22 is so embodied, the network status data is transmitted over an open communication connection from the wireless device 12,18,20,22 to the wireless network 14, such as an open voice or data call. If the wireless device is a cellular telephone 12 and the wireless network is a cellular telecommunication network, such as shown in FIG. 2, the network status data can be transmitted through short message service.

In view of the method being executable on the computer platforms of a wireless device 12, 18, 20, 22, and a server 16, the system can be implemented with a program resident in a computer readable medium, where the program directs a computer device 12, 18, 20, 22 having a device platform 50 to perform the steps of the method. Such program can be executed on any single computer platform, or can be multithreaded among several computer platforms. Furthermore, the invention includes a program that directs a computer device such as server 16 to perform the steps of optimizing the network through gathering and processing network status data from the wireless devices 12, 18, 20, 22.

The computer readable medium can be the memory 56 of the computer platform 50 of the cellular telephone 12, or other wireless device 18, 20, 22, or can be in a local database, such as local database 58 of the device platform 50. Further, the computer readable medium can be in a secondary storage media that is loadable onto a wireless device computer platform, such as a magnetic disk or tape, optical disk, hard disk, flash memory, or other storage media as is known in the art.

In the context of FIGS. 3 and 4, the present inventive method may be implemented, for example, by operating portion(s) of the wireless network 14 and/or LAN 30 to execute a sequence of machine-readable instructions, such as device platform 50 and server 16. The instructions can reside in various types of signal-bearing or data storage primary, secondary, or tertiary media. The media may comprise, for example, RAM (not shown) accessible by, or residing within, the components of the wireless network 14 or LAN 30. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

The invention claimed is:

1. A method of optimization, comprising:
   receiving, via a wireless transmission from a plurality of wireless devices, wireless network status data and wireless device state data corresponding to operation of the plurality of wireless devices on a wireless network;
   generating optimized network data based on the received network status data and the received wireless device state data;

optimizing the wireless network based upon the optimized network data; and remotely modifying a functionality of each wireless device operating on the wireless network based upon the optimized network data.

2. The method of claim 1, where remotely modifying each wireless device further comprises transmitting at least a portion of the optimized network data to each respective wireless device operating in the wireless network.

3. The method of claim 1, where receiving the wireless network network status data and the wireless device state data further comprises receiving based on execution of an optimization application resident on a computer platform of each of the plurality of wireless devices.

4. The method of claim 1, further comprising transmitting an optimization application to each of the plurality of wireless devices, where the optimization application is operable on each wireless device to selectively gather the wireless network status data and wireless device state data.

5. The method of claim 1, further comprising transmitting a request over the wireless network to each of the plurality of wireless devices to send the wireless network status data and wireless device state data.

6. The method of claim 1, where the wireless network status data comprises at least one of signal strength, Ec/Io, Latitude-Longitude, geographical data, Time, FER, BER, RSSI, PN, System ID, Network ID, and Model ID.

7. The method of claim 1, where the wireless device state data comprises at least one of idleness data, data call data, voice call data, dormancy data and inoperation data.

8. The method of claim 1, where receiving the wireless network status data and wireless device state data further comprises receiving cellular network status data and cellular device state data over a cellular telecommunication network at a server on the cellular telecommunication network.

9. The method of claim 8, where receiving the cellular network status data and the cellular device state data further comprises receiving via at least one of a short message service and piggybacked on a voice call or a data call.

10. A method of optimization, comprising:

wirelessly transmitting an optimization application to each of a plurality of wireless devices, wherein the optimization application is operable on each of the plurality of wireless devices to selectively gather wireless network status data and wireless device state data;

receiving, via a wireless transmission from the plurality of wireless devices and based on execution of the optimization application during operation on the wireless network, collected wireless network status data corresponding to the wireless network and collected wireless device state data corresponding to respective ones of the plurality of wireless devices;

generating optimized network data based upon the received collected wireless network status data and the received collected wireless device state data; and optimizing the wireless network based on the optimized network data.

11. A method of optimization, comprising:

wirelessly transmitting a request to download an optimization application to a plurality of wireless devices, wherein the optimization application is operable to selectively gather wireless network status data and wireless device state data;

receiving an approval to download the optimization application from the plurality of wireless devices;

wirelessly transmitting the optimization application to the plurality of wireless devices based on the received approval;

receiving, via a wireless transmission from the plurality of wireless devices and based on execution of the optimization application by each of the plurality of wireless devices during operation on the wireless network, collected wireless network status data corresponding to the wireless network and collected wireless device state data corresponding to respective ones of the plurality of wireless devices;

generating optimized network data based upon the received collected wireless network status data and the received collected wireless device state data;

optimizing the wireless network based on the optimized network data; and remotely modifying a functionality of selected wireless devices operating on the wireless network based upon the optimized network data.

12. A computer program product for optimizing a wireless network, comprising:

a computer-readable medium comprising:

a first set of instructions for causing a computer to wirelessly transmit an optimization application to each of a plurality of wireless devices, wherein the optimization application is operable on each of the plurality of wireless devices to selectively gather wireless network status data and wireless device state data a second set of instructions for causing the computer to receive, via a wireless transmission from the plurality of wireless devices and based on execution of a resident optimization application by each of the plurality of wireless devices during operation on the wireless network, collected wireless network status data corresponding to the wireless network and collected wireless device state data corresponding to respective ones of the plurality of wireless devices;

a third set of instructions for causing the computer to generate optimized network data based upon the received wireless network status data and the received wireless device state device; and a fourth set of instructions for causing the computer to optimize the wireless network based on the optimized network data.

13. A computer program product for optimizing a wireless network, comprising:

computer-readable medium, comprising:

a first set of instructions for causing a computer to wirelessly transmit a request to download an optimization application to a plurality of wireless devices, wherein the optimization application is operable to selectively gather wireless network status data and wireless device state data;

a second set of instructions for causing the computer to receive an approval to download the optimization application from the plurality of wireless devices;

a third set of instructions for causing the computer to wirelessly transmit the optimization application to the plurality of wireless devices based on the received approval;

a fourth set of instructions for causing the computer to receive, via a wireless transmission from a plurality of wireless devices and based on execution of a resident optimization application by each of the plurality of wireless devices during operation on the wireless network, collected wireless network status data corresponding to the wireless network and collected wireless device state data corresponding to respective ones of the plurality of wireless devices;

a fifth set of instructions for causing the computer to generate optimized network data based upon the received collected wireless network status data and the received collected wireless device state data; and a sixth set of instructions for causing the computer to remotely modify a functionality of selected wireless devices operating on the wireless network based upon the optimized network data.

14. An apparatus for optimizing a wireless network, comprising:

means for receiving, via a wireless transmission from a plurality of wireless devices, wireless network status data and wireless device state data corresponding to operation of the plurality of wireless devices on a wireless network;

means for generating optimized network data based upon the received wireless network status data and the received wireless device state data, wherein the optimized network data is operable to change a functionality of each wireless device operating on the wireless network;

means for optimizing the wireless network based on the optimized network data.

15. An apparatus for optimizing a wireless network, comprising a server having a receiver operable to receive, via a wireless transmission from a plurality of wireless devices, wireless network status data and wireless device state data corresponding to operation of the plurality of wireless devices on a wireless network, wherein the server further comprises an optimizer operable to generate optimized network data based on the received network status data and the received wireless device state data, and wherein the optimizer is further operable to optimize the wireless network based upon the optimized network data, and wherein the server is further operable to remotely modify a functionality of selected wireless devices operating on the wireless network based upon the optimized network data.

16. The apparatus of claim 15, wherein the server further comprises a transmitter operable to transmit at least a portion of the optimized network data to the selected wireless devices.

17. The apparatus of claim 16, wherein the transmitter is further operable to transmit an optimization application to selected ones of the plurality of wireless devices, wherein the optimization application is operable on the selected ones of the plurality of wireless devices to selectively gather the wireless network status data and the wireless device state data.

18. The apparatus of claim 16, wherein the transmitter is further operable to transmit a request over the wireless network to the plurality of wireless devices to send the wireless network status data and the wireless device state data.

19. The apparatus of claim 15, wherein the receiver is further operable to receive the wireless network status data and the wireless device state data based on execution of an optimization application resident on a computer platform of each of the plurality of wireless devices.

20. The apparatus of claim 15, wherein the wireless network status data comprises at least one of signal strength, Ec/Io, Latitude-Longitude, geographical data, Time, FER, BER, RSSI, PN, System ID, Network ID, and Model ID.

21. The apparatus of claim 15, wherein the wireless device state data comprises at least one of idleness data, data call data, voice call data, dormancy data and inoperation data.

22. The apparatus of claim 15, wherein the wireless network comprises a cellular telecommunications network and wherein the plurality of wireless each comprises a cellular device.

23. An apparatus for optimizing a wireless network, comprising:

a transmitter operable to wirelessly transmit an optimization application to each of a plurality of wireless devices, wherein the optimization application is operable on each of the plurality of wireless devices to selectively gather wireless network status data and wireless device state data;

a receiver operable to receive, via a wireless transmission from a plurality of wireless devices, collected wireless network status data and collected wireless device state data corresponding to operation of the plurality of wireless devices on a wireless network;

an optimizer operable to generate optimized network data based upon the received collected wireless network status data and the received collected wireless device state data, wherein the optimized network data is operable to change a functionality of each wireless device operating on the wireless network; and wherein the transmitter is further operable to transmit the optimized network data to selected wireless devices operating on the wireless network.

24. An apparatus for optimizing a wireless network, comprising:

a transmitter operable to wirelessly transmit a request to download an optimization application to a plurality of wireless devices, wherein the optimization application is operable to selectively gather wireless network status data and wireless device state data, and further operable to wirelessly transmit the optimization application to the plurality of wireless devices based on a received approval responsive to the request;

a receiver operable to receive, via a wireless transmission from a plurality of wireless devices, collected wireless network0 status data and collected wireless device state data corresponding to operation of the plurality of wireless devices on a wireless network; and an optimizer operable to generate optimized network data based upon the received collected wireless network status data and the received collected wireless device state data, further operable to optimize the wireless network based on the optimized network data, and further operable to remotely modify a functionality of each wireless device operating on the wireless network based upon the optimized network data.

25. A wireless device, comprising:

a computer platform; and an optimization application resident on the computer platform and executable to collect wireless network status data and wireless device state data corresponding to operation of the wireless device on a wireless network, and wherein the optimization application is further operable to cause the selective transmission of the wireless network status data and wireless device state data across the wireless network, wherein the optimization application is further operable to receive wireless network optimization data from the wireless network, wherein the network optimization data is based on a plurality of wireless network status data and a plurality of wireless device state data from a plurality of wireless devices operating on the wireless network, wherein the plurality of wireless network status data and the plurality of wireless device state data respectively comprises the wireless network status data and wireless device state data collected by the wireless device, wherein the network optimization data is operable by the wireless network to produce an optimized wireless network, wherein the wireless network optimization data is executable on the computer platform to cause a change in a functionality of the wireless device in accord with the optimized wireless network.

26. The wireless device of claim 25, wherein the computer platform is further operable to transmit across the wireless network a download request to receive the optimization application.

27. The wireless device of claim 25, wherein the network status data comprises at least one of signal strength, Ec/Io, Latitude-Longitude, geographical data, Time, FER, BER, RSSI, PN, System ID, Network ID, and Model ID.

28. The wireless device of claim 25, wherein the wireless device state data comprises at least one of idleness data, data call data, voice call data, dormancy data and inoperation data.

29. The wireless device of claim 25, wherein the computer platform further comprises a memory, and wherein the computer platform is operable to receive optimization application from across the wireless network and store the optimization application in the memory.

30. A method of optimization, comprising:
    collecting wireless network status data and wireless device state data corresponding to operation of the wireless device on a wireless network;
    transmitting the wireless network status and the wireless device state data over the wireless network;
    receiving network optimization data from the wireless network, wherein the network optimization data is based on a plurality of wireless network status data and a plurality of wireless device state data from a plurality of wireless devices operating on the wireless network, wherein the plurality of wireless network status data and the plurality of wireless device state data respectively comprises the wireless network status data and wireless device state data collected by the wireless device, wherein the network optimization data is operable by the wireless network to produce an optimized wireless network; and
    modifying a performance of the wireless device based upon the network optimization data in accord with the optimized wireless network.

31. The method of claim 30, wherein the collecting of the wireless network status data and wireless device state data further comprises executing an optimization application resident on the wireless device.

32. The method of claim 31, further comprising receiving the optimization application over the wireless network and storing the optimization application in a memory of the wireless device.

33. The method of claim 32, further comprising transmitting across the wireless network a download request to receive the optimization application.

34. A computer program product for optimizing a wireless network, comprising:
    a computer-readable medium, comprising:
        a first set of instructions operable to cause a computer to collect wireless network status data and wireless device state data corresponding to operation of the wireless device on a wireless network;
        a second set of instructions operable to cause the computer to transmit the wireless network status and the wireless device state data over the wireless network;
        a third set of instructions operable to cause the computer to receive network optimization data from the wireless network, wherein the network optimization data is based on a plurality of wireless network status data and a plurality of wireless device state data from a plurality of wireless devices operating on the wireless network, wherein the plurality of wireless network status data and the plurality of wireless device state data respectively comprises the wireless network status data and wireless device state data collected by the wireless device, wherein the network optimization data is operable by the wireless network to produce an optimized wireless network; and
        a fourth set of instructions operable to cause the computer to modify a performance of the wireless device based upon the network optimization data in accord with the optimized wireless network.

35. A wireless device comprising:
    means for collecting wireless network status data and wireless device state data corresponding to operation of the wireless device on a wireless network;
    means for transmitting the wireless network status and the wireless device state data over the wireless network;
    means for receiving network optimization data from the wireless network, wherein the network optimization data is based on a plurality of wireless network status data and a plurality of wireless device state data from a plurality of wireless devices operating on the wireless network, wherein the plurality of wireless network status data and the plurality of wireless device state data respectively comprises the wireless network status data and wireless device state data collected by the wireless device, wherein the network optimization data is operable by the wireless network to produce an optimized wireless network; and
    means for modifying a performance of the wireless device based upon the network optimization data in accord with the optimized wireless network.

* * * * *